Nov. 23, 1926. Re. 16,484

G. H. STONER

BRAKE

Original Filed Jan. 3, 1925 2 Sheets-Sheet 1

Inventor
George H. Stoner
By Ellis Spear
Attorney

Nov. 23, 1926. Re. 16,484

G. H. STONER

BRAKE

Original Filed Jan. 3, 1925 2 Sheets-Sheet 2

Inventor
George H. Stoner
By Chas. Spencer
Attorney

Reissued Nov. 23, 1926.

Re. 16,484

UNITED STATES PATENT OFFICE.

GEORGE H. STONER, OF EAST BOSTON, MASSACHUSETTS, ASSIGNOR TO TRU-ARC INC., OF BROOKLINE, MASSACHUSETTS, A CORPORATION OF MASSACHUSETTS.

BRAKE.

Original No. 1,550,399, dated August 18, 1925, Serial No. 304, filed January 3, 1925. Application for reissue filed April 22, 1926. Serial No. 103,978.

My invention as herein involved relates to brakes and particularly to those of expanding type such as are installed in automobiles and like vehicles.

Much difficulty has been experienced with such brakes in regard to inequalities of wear and difficulties of adjustment with the result that it has been difficult, if not impossible, to maintain the efficiency of such brakes for any considerable period of use.

In such brakes much difficulty has been experienced in devising expansion members which would under given conditions apply uniform or nearly uniform radial resistance to the brake drum. To supply such a brake and such an internal expansion apparatus has been the urge of my thought. I have provided for general principles and at the same time have devised specific apparatus of immediate and practical utility in solving some of the brake problems of standard automobile construction as appears in automobile use.

In accordance with my invention I am able to provide a simple and effective brake having a great uniformity of bearing surface and having a wide range of adjustment which can be very easily made to take up such wear as is inevitable.

My invention is therefore to be considered not only as a brake but as a braking mechanism capable of installation or substitution in existing cars and particularly in certain cars to which its immediate applicability will be obvious to those skilled in the art.

As illustrative of my invention I have shown in the accompanying drawings a form of brake which I have found to be very efficient and one which can be readily embodied in a new car or substituted in an old car without any increase in expense and with a considerable ultimate saving. Throughout the specification and drawings like reference characters are employed to indicate corresponding parts, and in the drawings:—

Figure 1:
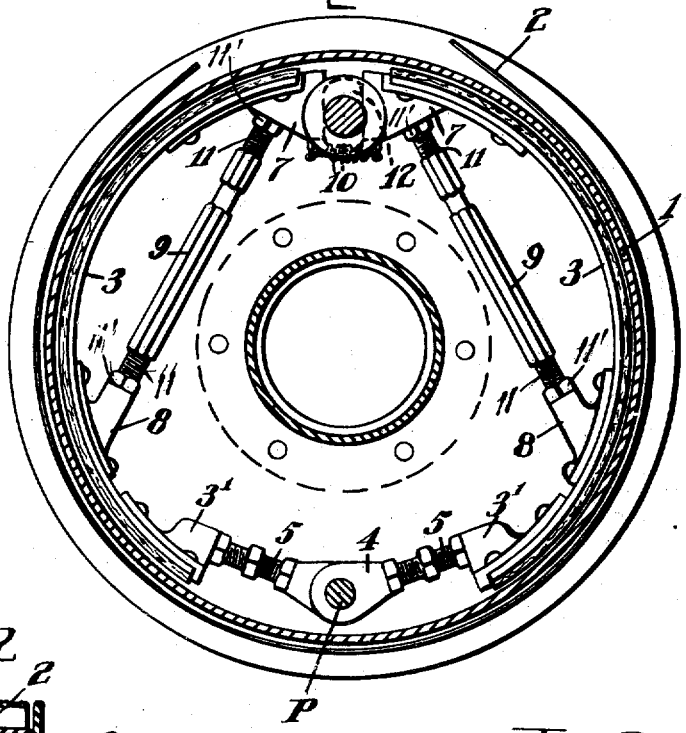
Fig. 1 is a side elevation partly in section of a brake in accordance with my invention.
Figure 2:
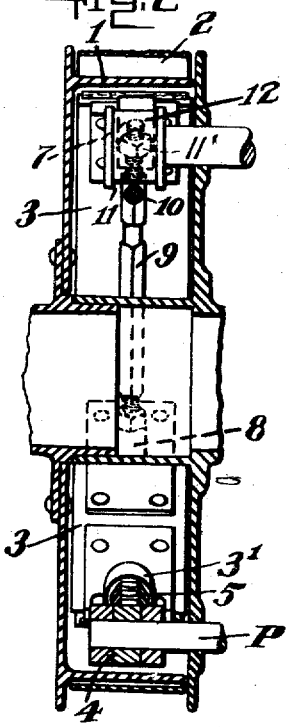
Fig. 2 is a central vertical section.

I have indicated at 1 the usual brake drum of an automobile wheel, and at 2 a portion of the usual external contracting band operating thereon. Within such a drum I provide as an expansion member a construction which is in part rigid and in part flexible, as will be hereinafter described.

Primarily, my expansion member consists of flexible or resilient bands or strips 3, 3 which are united by a hinge member 4 to which they are adjustably connected by threaded studs 5 reversely threaded at their opposite ends into the blocks $3^1$ and one of the hinge members 4 which slip on the bracket pintle P. On each one of the bands 3 I rivet a pair of members 7 and 8. The member 8 is tapped to receive a reversely threaded adjusting screw 9 the other end of which is tapped into the member 7 so as to provide for the adjustment of these members. The reverse threading of the members 9 is indicated at 11 and lock nuts $11^1$ are provided for holding their adjustment in the blocks 7 and 8. The two members 7 are yieldingly held together in contracted position by a spring 10.

Figure 5:
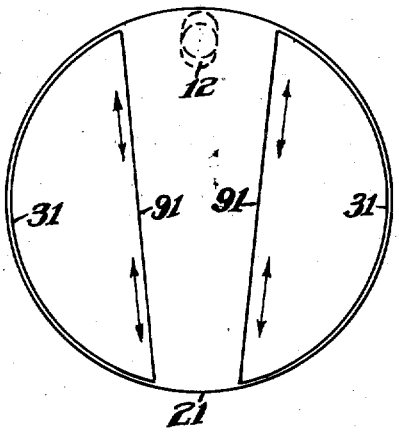

When properly adjusted my brake gives great uniformity of contact and consequently uniformity of wear. While in many cars the brake shoes are readily accessible for adjustment, my brake shoes may be initially adjusted by mounting them in a test drum of the size to which they are to be applied. For example, in the service station, I have standard drums for the make of car to be equipped. In such test drums, I fix a dummy anchor pin which occupies the same position relative to the drum as the regular pin occupies on the car. This is merely a convenience in holding the brake shoes in the test drum while they are being adjusted. After the arc members are brought to proper curvature, as shown in Fig. 5, they are moved circumferentially as described in connection with Fig. 6. In the test drum, I use either a spare cam member 12 or a block of like thickness simply to gauge this circumferential movement and give the ends of the segments contact with the cam 12 of the brake equipment of the car when the segments are mounted in place after adjustment.

All this adjustment, above referred to, is preliminary to installation. After installing, the brakes are on their usual permanent anchor pin and can be adjusted against their permanent cams.

To compensate for the inevitable wear of the cam 12 on the blocks 7, as well as to make readjustment after recurving the segments, the studs 5 may be adjusted so that no shimming or welding of additional bearing surface is required. The studs 5 simply peripherally relocate the segments 3 until their end blocks 7 are in proper relation to the cam 12. When the cam 12 is actuated it forces apart the blocks 7, the resultant force through the connection 9 moving the entire segment outward as a unit. This movement is substantially radial and the bands 3 respond to it to effect a substantially uniform braking action.

Figure 4:
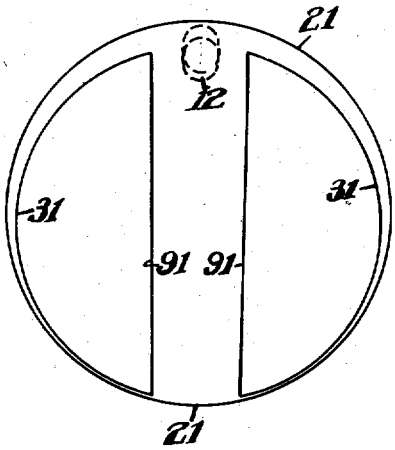
Figs. 4, 5, 6 and 7 are diagrammatic views illustrating individual and relative adjustability of the segments.
Figure 6:
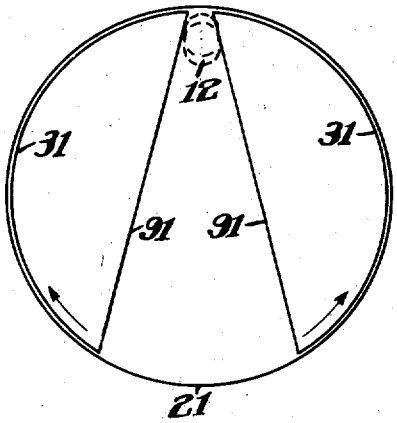

The foregoing adjustment may be best understood in its geometrical characteristic by reference to the diagrammatic Figs. 4 to 6. In these figures I have indicated by the circle 21 the outline of the brake drum. Inscribed in this circle 21 are two arcs 31 which in Fig. 4 are drawn intentionally in nonconforming relation to the circle 21 to indicate a theoretical position of the expansion members of the brake when not in properly adjusted position. Connecting the ends of these arcs I have drawn lines 91 which constitute chords for the arcs and indicate the lines of chord adjustment in flexing or changing the curvature of the arcs 31.

In Fig. 5 the arcs 31 are shown expanded by the chords 91 to substantial conformity with the indicated drum 21. In practice they are adjusted to a very close parallelism.

In Fig. 6 I have shown the arcs 31 so adjusted by expansion as indicated by the arrows to bring their open ends adjacent to the cam 12 indicated in dotted lines in the diagram. This corresponds generally to the position of the parts shown in Fig. 1 of the drawings.

Figure 3:
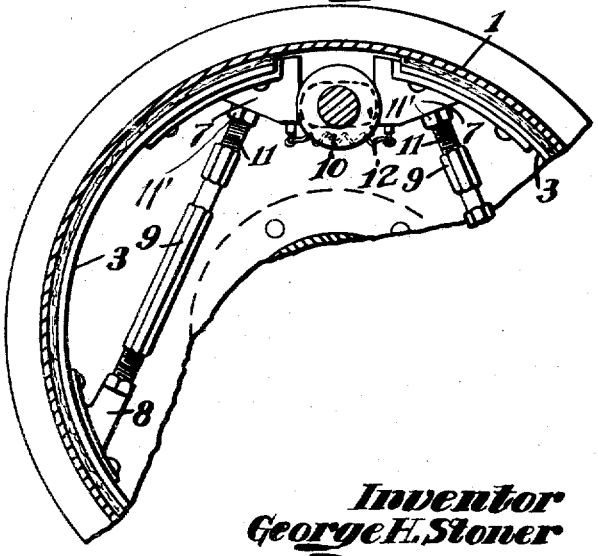
Fig. 3 is a fragmentary view like Fig. 1 but with the member expanded.
Figure 7:
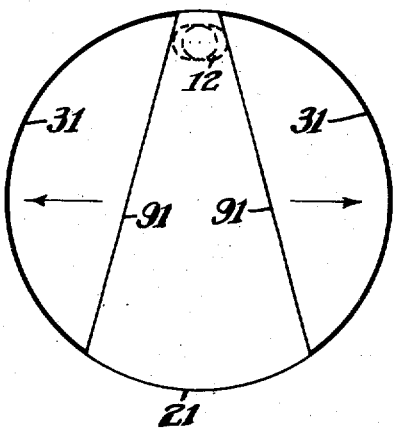

In Fig. 7 I have shown the segments 31 and 91 expanded by the cam 12. By the resolution of the force so exerted these segments are moved substantially radially outward as indicated by the arrows so as to give a maximum of uniformity in the contact of the arc surfaces with the enclosing circle 21. The diagram in Fig. 7 is intended to correspond generally with the position of the parts shown in Fig. 3.

My expansion members may be substituted in certain standard brakes replacing more cumbersome rigid parts. All that is necessary to do is to remove these specific rigid expansion members and substitute my strips 3, slipping the hinge member 4 over the usual pintle P, and adjusting the threaded studs 5 to properly position the end bearings of the castings 7 against the operating cam. This replacement can be made in less time and with less expense than is required in relining and readjusting certain standard brakes which do not have uniform bearing nor an internal adjustment.

Various modifications may obviously be made in the design of the blocks and the character of the adjustments, all without departing from the spirit of my invention if within the limits of the appended claims.

What I therefore claim and desire to secure by Letters Patent is:

1. In a brake of the class described, an expansion member comprising a pair of flexible band segments pivotally mounted adjacent an end of each, a bearing adjacent the opposite end of each of said segments, means for adjusting each segment with reference to a subtended chord, and means for relatively moving the segments circumferentially with reference to an enclosing brake drum.

2. In a brake, an expansion member comprising a flexible band segment, and a rigid adjusting piece effectively disposed with reference thereto in the line of a subtending chord, a hinge member for supporting said segment, and means for positively adjusting said segment relatively to said hinge.

3. In a brake of the class described, an expansion member comprising a flexible band, a pair of rigid members permanently connected adjacent the ends thereof, an adjustable rigid strut between said rigid members, a hinge member and an adjustable connection between said expansion member and said hinge member.

4. In a brake of the class described, an expansion member therein comprising a pair of flexible band segments, means for adjustably bending said flexible segments, a hinge member connecting the segments, and adjusting means in the hinge member for circumferentially adjusting them with reference to an enclosing brake drum.

5. An expansion member for a brake, comprising a pair of flexible arc shaped bands, means for adjusting the curvature of said bands, and means for adjusting the bands circumferentially with relation to a substantially concentric enclosing circle.

6. In a brake mechanism, a pair of expansion members each comprising a flexible arc shaped band, means for adjusting the curvature of said bands, means for adjusting the bands circumferentially with relation to a substantially concentric enclosing brake drum, and means for expanding the band segment to engage the drum.

7. In a brake of the class described, an expansion member comprising a pair of flexible band segments hinged in relative circumferential adjustment at one end of each, a block permanently connected adjacent each end of each of said segments and adjustable rigid struts between the block segments, the block at the free end of each segment having an operating bearing each disposed in opposition to the other.

8. In a brake of the class described, an expansion member comprising a pair of flexible band segments, a hinge member at one end of each, a block permanently connected adjacent each end of each of said segments, and an adjustable rigid strut between the blocks of each segment, and an adjusting piece carried at the first mentioned end of each segment and connected in adjusting relation to its hinge member.

9. In a brake, a brake drum having an internal friction shoe including an arc member, means for positively adjusting the effective radius of said arc member, an expanding device for said shoe, and means for relative circumferential co-operative adjustment between the shoe and the expansion device.

In testimony whereof I affix my signature.

GEORGE H. STONER.